United States Patent [19]
Le Van Mao et al.

[11] Patent Number: 4,810,280
[45] Date of Patent: Mar. 7, 1989

[54] METHOD FOR ENHANCING WATER RETENTION IN SOIL

[76] Inventors: Raymond Le Van Mao, 3832, de la Peltrie Street, Montreal, Quebec, Canada, H3S 1V3; Gerald P. McLaughlin, 1251, St-Marc Street, Apt. 9, Montreal, Quebec, Canada, H3H 2E8; Pierre Levesque, 3825, Dupuis St., Apt. 2, Montreal, Quebec, Canada, H3T 1E5; Jacques Dunnigan, 80, Des Erables Street, Sherbrooke, Quebec, Canada, J1L 1E1

[21] Appl. No.: 47,288

[22] Filed: May 8, 1987

[51] Int. Cl.$^4$ .......................... C05G 3/06; C05D 5/00; C05D 9/00
[52] U.S. Cl. .......................... 71/62; 71/903; 423/328; 423/324; 423/331
[58] Field of Search .......................... 423/328, 329, 331; 71/62, 11, 31, 903

[56] References Cited
U.S. PATENT DOCUMENTS 2,882,244  4/1959  Milton .............................. 423/328 C
3,094,383  6/1963  Dzierzonowski et al. ......... 423/328
3,623,858 11/1971  Smith et al. ............................. 71/62
4,511,667  4/1985  Mao ....................................... 502/64
4,615,995 10/1986  Mao ....................................... 502/64

Primary Examiner—Ferris H. Lander
Attorney, Agent, or Firm—Cushman, Darby & Cushman

[57] ABSTRACT

The present invention relates to a method for enhancing the water-retention capacity of soils and providing plant nutrients to same over an extended period of time. This method comprises the admixing of soils with from 2 to 30% by weight of a chryso-zeolite of type A/and or X which comprises a magnesium leached asbestos matrix having an $SiO_2$ content of 37 to 60% wt %, an MgO content of 0.1 to 15% by weight, an $Fe_2O_3$ content of 0.1 to 2.5% by weight and containing from 10 to 25% by weight of $Al_2O_3$ and from 25 to 35% by weight of $Na_2O$, and/or $K_2O$, and/or CaO, and/or $(NH_4)_2O$.

6 Claims, 5 Drawing Sheets

METHOD FOR ENHANCING WATER RETENTION IN SOIL

BACKGROUND OF THE INVENTION

The tendency for a soil to lose its nutritive properties and therefore to go through a certain form of degradation is related mainly to its low water retention efficiency and to its slow but noticeable chemical changes which are caused by the action of various external factors such as acid rain.

The use of synthetic and natural zeolites as soil conditioners has been studied extensively over the last few years. In fact, apart from industrial applications as selective adsorbents and catalysts, their use as soil conditioners is one of the most important applications recently developed.

The zeolites not only improve the physical properties of the soil, but their postulated mode of action in crop growth exploits the ion-exchange capabilities for the nutritive ions such as $NH_4^+$ and $K^+$. Thus, the high exchange and absorption capacity and the retention of the absorbed ions create nutritive and humidity conditions around the roots which are beneficial to the crop.

The zeolite action is therefore that of a solid material which by virtue of its physico-chemical properties enhances the efficiency of classical fertilizers. It is likely that the primary nutrient ions in fertilizers are initially taken up by the zeolite framework, which then gradually releases these ions to the soil and the roots of the plants. More particularly, the reversible cation-exchange capability of the zeolites permits overcoming of phenomena such as the washing away of fertilizers during irrigation, when the water-soluble primary nutritive components are rapidly lost, leading to a decrease in efficiency. Furthermore, because of the good water adsorption properties of the zeolites, the roots of the crops are provided with appropriate humidity conditions for an extended period of time.

To summarize, zeolitic materials show a great retention capacity for water and other soluble organic and inorganic compounds, thus favoring better growth of a large number of vegetal species. Therefore, because of their chemical properties and their anti-abrasive resistance, these zeolitic materials, once added to the soil, constitute long lasting soil conditioners. Because of their good ion-exchange properties, various chemical compounds such as water, compounds containing water-soluble elements such as nitrogen, potassium, or other water-soluble inorganic cations such as potassium, calcium, manganese, copper, iron and magnesium among others can be pre-incorporated into the zeolitic material and/or can be ion-exchanged into the zeolitic lattice from the soil solution.

Another interesting property of the zeolites is the fact that they possess a rigid framework which prevents them from undergoing structural condensation upon severe drying conditions as is frequently the case for commonly used clays. The latter, when collapsed, trap the ions present in their structures, thus preventing any further supply to the plant roots.

Promising results were obtained for most of the zeolites which were the object of investigations. In fact, it was found that an average increase of approximately 50% in the degree of moisture of normal soil could be sustained for 8 to 12 days by incorporating a zeolite material. However, all the commercial zeolites studied to date were found to possess an interesting but limited water-retention capacity.

SUMMARY OF THE INVENTION

In accordance with the present invention, it has been unexpectedly discovered that chryso-zeolites possess exceptionally good soil conditioning and soil anti-degradation properties when compared to the zeolites normally employed in the art. In fact, it has been found that the chryso-zeolites water retention capacity when combined with their ion-exchange properties particularly in the case of alumina-rich zeolites provide for enhanced soil properties by making available better supplies of water and all varieties of plant nutrients including inorganic oligo-elements.

Also, there is provided a method for enhancing the water-retention capacity of soils and providing for the release of plant nutrients to same, over an extended period of time, said method comprising admixing of agricultural soils with from 2 to 30% by weight of a chryso-zeolite of type A or X which comprises of a magnesium leached asbestos matrix having an MgO content of 0.1 to 15 wt%, an $Fe_2O_3$ content of 0.1 to 2.5 wt% and containing from 10 to 25 wt% of $Al_2O_3$ and from 25 to 35 wt% of $Na_2O$ and/or $K_2O$ and/or CaO and/or $(NH_4)_2O$.

IN THE DRAWINGS

DETAILED DESCRIPTION OF THE INVENTION

Figure 1:
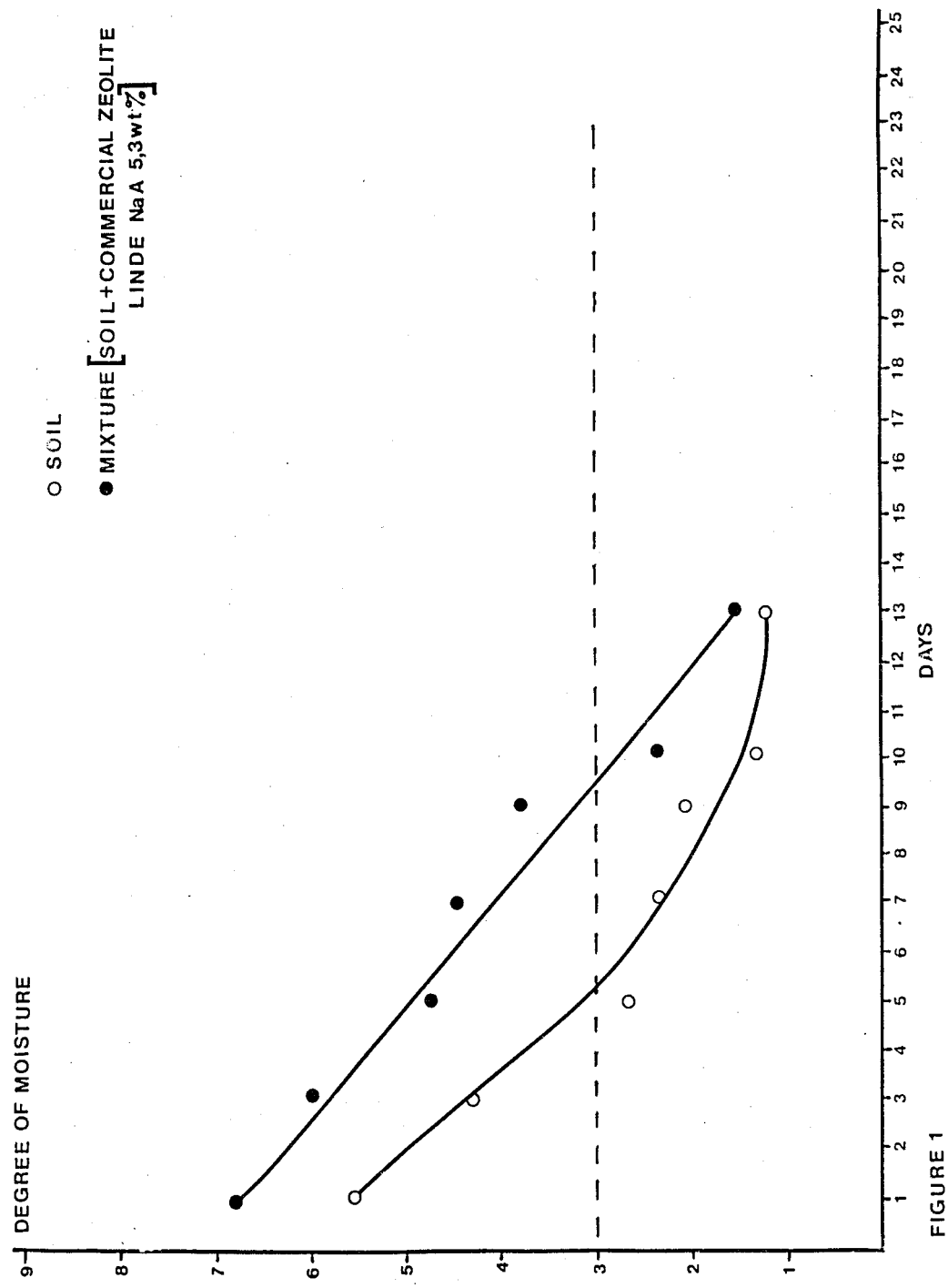
FIG. 1 represents a comparison of the water-retention properties of soil containing commercial zeolite Linde Na-A and soil alone.

The present invention thus relates to the use of the unexpectedly good qualities of chryso-zeolites in terms of soil conditioning as well as anti-degradation agents in order to develop high quality soil conditioners.

According to the present invention, the most desirable formulae for soil conditioners comprise either one or both of the following chryso-zeolite structures:

The A type chryso-zeolite, preferably in K, ammonium or Ca-exchanged form, which contains some Fe, Mg and other minor components in the asbestos remnants, the exact structure of which will be defined further.

The X type chryso-zeolite, preferably in K, ammonium or Ca-exchanged form, which contains some Fe, Mg and other minor components in the asbestos remnants, the exact structure of which will also be defined further.

CHRYSO-ZEOLITE TYPE A OR CHRYSO-ZEOLITE A

General Composition

The term chryso-zeolite Z (or chrysozeolite A) when used herein is intended to include crystalline zeolite materials prepared from 3 to 7 grade-chrysotile asbestos, preferably from 5 to 7 grade-chrysotile asbestos, and more preferably from 7TF grade-chrysotile asbestos. Chryso-zeolite A can therefore be represented by the following basic formula:

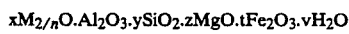

$$xM_{2/n}O \cdot Al_2O_3 \cdot ySiO_2 \cdot zMgO \cdot tFe_2O_3 \cdot vH_2O$$

wherein M represents at least one of the materials in the group consisting of hydrogen, ammonium, metals of groups I and II of the periodic table, and the transition metals of the periodic table; "n" represents the valence of M; $x \leq 1.0$; $y \geq 1.85 \pm 0.5$; $z \geq 4.0$; $t \geq 0.2$ and $v \geq 6$. It is to be noted that the iron oxide component, represented here by $Fe_2O_3$ can actually be found in various oxide forms.

In the examples of the present invention, the chemical composition of chryso-zeolite A is reported on the dried oxide basis, meaning that the water content of the materials is not taken into account in the calculations, only for simplification purposes. The crystalline synthetic chryso-zeolite Z can be easily differentiated from other chryso-zeolites by comparing its X-ray powder diffraction pattern.

X-ray Powder Diffraction Analysis of Type A Chryso-Zeolite

X-ray analysis was carried out by the powder diffraction method, using a wide-angle diffractometer equipped with a proportional counter, using the $K_{alpha}$ radiation of copper (lambda = 1.54178 Å), filtered with a nickel foil.

Heights 1 and angular positions of the diffraction peaks were deduced from the diffractograms. Relative intensities $100^l/I_o$ were determined on the basis of height $I_o$ of the most intense diffraction peak and translated into an arbitrary value scale as follows:

| [100 × 1/$I_o$] | relative intensity |
| --- | --- |
| 100–80 | VS (very strong) |
| 80–60 | S (strong) |
| 60–40 | M (medium) |
| 40–20 | MW (medium-weak) |
| 20–5 | W (weak) |
| less than 5 | VW (very weak) |

Interplanar spacings "d" expressed in Angstroms were determined on the basis of the diffraction angle 2 theta of the recorded peaks.

Table 1 reports the X-ray powder diffraction patterns (main peaks) of:
the dehydrated sodium zeolite A (simulated pattern by R. Von Balmoos, in "Collection of simulated XRD Powder Patterns for zeolites", Butterworth Sc. Ltd. Publishers, p. 64–65, 1984);
the commercial sodium zeolite A supplied by Linde Air Products;
the sodium chryso-zeolite A of this invention.

TABLE 1

Main peaks of the X-ray powder diffraction patterns of type A chrysozeolites

| Simulated pattern of Na—A | | Commercial Na—A (Linde) | | Chrysozeolite A (sodium form) | |
| --- | --- | --- | --- | --- | --- |
| d (Å) | Relative intensity | d (Å) | Relative intensity | d (Å) | Relative intensity |
| 12.3 | VS | 12.3 | VS | 12.3 | VS |
| 8.7 | M | 8.7 | S | 8.7 | S |
| 7.09 | MW | 7.14 | M | 7.11 | M |
| — | — | — | — | 6.37 | MW |
| 5.49 | MW | 5.50 | MW | 5.50 | M |
| 4.09 | W | 4.07 | S | 4.07 | S |
| 3.70 | W | 3.71 | VS | 3.71 | VS |
| — | — | — | — | 3.68 | MW |
| 3.40 | VW | 3.40 | MW | 3.41 | MW |
| — | — | 3.34 | MW | — | — |
| 3.28 | W | 3.28 | VS | 3.28 | VS |
| 2.98 | W | 2.98 | VS | 2.98 | VS |
| 2.62 | W | 2.62 | S | 2.62 | S |

Preparation of Type A Chryso-Zeolite

Type A chryso-zeolite is prepared according to the following procedure:

(a) leaching chrysotile asbestos fibers 3 to 7 grade preferably 7TF grade with an acidic solution selected from HCl, $H_2SO_4$ and $HNO_3$ in concentrations ranging between 1 and 6N, preferably from HCl in concentrations ranging between 1 and 3N and more preferably from HCl 3N at a temperature ranging from 20° to 80° C. but preferably 80° C. for a time ranging between 2 and 240 hours but preferably from 10 to 12 hours until part of the metal components of the asbestos lattice is solubilized, the ratio ml acidic solution: g of asbestos ranging between 5 and 20;

(b) impregnating the dried solid obtained in (a) with an aliali metal hydroxide preferably sodium hydroxide in aqueous solution and adding a solution of an aluminate of an alkali metal preferably sodium to obtain a geliform suspension;

(c) heating the resulting mixture sufficiently to yield crude zeolite formations in situ. The temperature used to crystallize the chryso-zeolite A ranges from 20° C. to 150° C. for a time ranging from 1 hour to several weeks, preferably from 1 hour to 5 days.

The gelified form suspension of step (b) has an overall chemical composition which can be defined in terms of oxide-mole ratios:
$SiO_2/Al_2O_3$ from 0.5 to 2.5
$Na_2O/SiO_2$ from 0.8 to 3.0
$H_2O/Na_2O$ from 35 to 200
$MgO/SiO_2$ less than 1.0
$Fe_2O_3/SiO_2$ less than 0.1

Such a procedure of synthesizing zeolite materials from leached asbestos bears some similarities with that described in U.S. Pat. No. 4,511,667.

CHRYSO-ZEOLITE TYPE X OR CHRYSO-ZEOLITE X

General Composition

The term chryso-zeolite X (or chrysozeolite X) when used herein is intended to include crystalline zeolite materials prepared from 3 to 7 grade-chrysotile asbestos fibers, preferably from 7TF grade-chrysotile asbestos. Thus, chrysozeolite X can be generally represented by the following basic formula:

$$xM_{2/n}O \cdot Al_2O_3 \cdot ySiO_2 \cdot zMgO \cdot tFe_2O_3 \cdot vH_2O$$

where M represents at least one of the materials in the group consisting of hydrogen, ammonium, metals of groups 1 and 11 of the periodic table, and the transition metals of the periodic table; "n" represents the valence of M; $x \geq 1.0$; $y \geq 2.5 \pm 0.5$; $z \geq 4.0$; $t \geq 0.2$ and $v \geq 8$. The iron oxide component represented by $Fe_2O_3$ can actually be found in various oxide forms.

In the examples of the present invention the chemical composition is reported on the dried oxide basis which means that the water content of the materials is not taken into account in these calculations, only for simplification purpose.

The crystalline structure of synthetic chryso-zeolite X may be differentiated from other chryso-zeolite structures by X-ray powder diffraction patterns.

X-ray Powder Diffraction Analysis of Type X Chryso-Zeolite

X-ray analysis was carried out using the method previously described for chryso-zeolite A.

Table 2 reports the X-ray powder diffraction patterns (main peaks) of:

the sodium zeolite X (simulated pattern by R. Von Balmoos, in "Collection of simulated XRD Powder Patterns for zeolites", Butterworth Sc. Ltd. Publishers, p. 36–37, 1984);

the commercial sodium zeolite X supplied by Linde Air Products;

the sodium chryso-zeolite X of the present invention.

TABLE 2

Main peaks of the X-ray powder diffraction patterns of type X chrysozeolites

| Simulated pattern of Na—X | | Commercial Na—X (Linde) | | Chrysozeolite X (sodium form) | |
|---|---|---|---|---|---|
| d (Å) | Relative intensity | d (Å) | Relative intensity | d (Å) | Relative intensity |
| 14.45 | VS | 14.49 | VS | 14.49 | VS |
| 8.85 | W | 8.85 | MW | 8.85 | MW |
| 7.55 | VW | 7.56 | MW | 7.56 | MW |
| — | — | — | — | 7.14 | MW |
| 5.74 | W | 5.75 | M | 5.72 | M |
| — | — | — | — | 5.07 | W |
| 4.82 | VW | 4.82 | W | 4.82 | W |
| 4.42 | VW | 4.42 | MW | 4.42 | W |
| — | — | — | — | 4.11 | MW |
| 3.82 | W | 3.82 | S | 3.79 | S |
| 3.34 | W | 3.34 | M | 3.33 | M |
| — | — | — | — | 3.19 | MW |
| 2.95 | VW | 2.94 | W | 2.94 | W |
| 2.89 | W | 2.88 | M | 2.88 | M |
| 2.80 | VW | 2.79 | W | 2.79 | MW |
| 2.67 | VW | 2.66 | MW | 2.66 | MW |

Preparation of Type X Chryso-zeolite

Chryso-zeolite X is prepared according to the following procedure:

(a) leaching chrysotile asbestos fibers 3 to 7 grade preferably 7TF grade with an acidic solution selected from HCl, $H_2SO_4$ and $HNO_3$ in concentrations ranging between 1 and 6N preferably from HCl in concentrations ranging between 1 and 3N and more preferably from HCl 3N at a temperature ranging from 20° to 80° C. but preferably 80° C. for a time ranging between 2 and 240 hours but preferably from 10 to 12 hours until part of the metal components of the asbestos lattice is solubilized, the ratio ml acidic solution: g of asbestos ranging between 5 and 20;

(b) impregnating the dried solid obtained in (a) with an alkali metal hydroxide preferably sodium hydroxide in aqueous solution and adding a solution of an aluminate of an alkali metal preferably sodium to obtain a geliform suspension;

(c) heating the resulting mixture sufficiently to yield crude zeolite formations in situ. The temperature used to crystallize the chryso-zeolite X ranges from 20° C. to 150° C. for a time ranging from 1 hour to several weeks, preferably from 1 hour to 5 days.

The gelified form suspension of step (b) has an overall chemical composition which can be defined in terms of oxide-mole ratio:

$SiO_2/Al_2O_3$ from 3.0 to 5.0
$Na_2O/SiO_2$ from 1.2 to 1.5
$H_2O/Na_2O$ from 35 to 60
$MgO/SiO_2$ less than 0.50
$Fe_2O_3/SiO_2$ less than 0.05

Such a procedure of synthesizing zeolitic materials from leached asbestos bears some similarities with that described in U.S. Pat. No. 4,511,667.

Incorporation of Extraneous Compounds into Chryso-Zeolites A or X

To incorporate extraneous compounds such as ions for example hydrogen, ammonium, of metals in groups 1 and 11 of the periodic table, and the transition metals of the periodic table, salts and/or others, into the chrysozeolites, one can follow any procedure of ion-exchange, impregnation, coating, and others known in the art. Such a procedure is described by D. W. Breck in "Zeolite Molecular Sieves Structure, Chemistry and use", John Wiley & Sons Publishers, New York (1974).

For use as water retention capacity enhancers for soil, soil ion-exchange conditioners or fertilizers, the preferred forms are the Ca and/or K forms.

Other Types of Chrysozeolites Useful as Soil Conditioners

The most suitable zeolite structures used to prepare the preferred conditioners are of the A and X types. However, other structures are also effective, particularly when specific adsorption or ion-exchange properties are required and these are closely related to particular needs of types of soils and/or of plants (for example, ammonium ion selective clinoptilolite).

As another example of chryso-zeolite material there may be mentioned a pentasil zeolite-asbestos composite compound comprising a magnesium and iron leached asbestos micro-matrix having a crystallized pentasil zeolite alternatively having a portion of its internal acid reaction sites replaced with zinc ions and alternatively having manganese ions adsorbed on the external surface thereof, said magnesium and iron leached asbestos micro-matrix being alternatively doped internally with zinc ions and externally with manganese ions, the amount of zinc ions being from 0.1 to 0.5% w/w the amount of manganese being from 0.2 to 0.8% w/w. This zeolitic material used as a catalyst can be prepared using the method disclosed in U.S. Pat. No. 4,615,995 issued on Oct. 7, 1986.

Generally speaking, combined zeolite structures seem to offer the most versatile adsorption-ion-exchange properties to such zeolitic soil conditioners. Therefore combinations of A/X chrysozeolite types in ratios varying between 10/1 and 1/1 provide very efficient soil conditioners.

Use of Chrysozeolites of the Present Invention as soil Conditioners

In order to provide effective conditioning of a soil with the compounds of the present invention, either one of the two types of chryso-zeolites previously described, namely types A or X or a mixture thereof can be mechanically admixed with soil in a proportion ranging from 2 to 30% by weight or spread on the soil in a proportion ranging from 0.3 to 7 metric tons per acre. As far as anti-degradation treatment is concerned, the same proportions of the A and/or X type chryso-zeolite can be applied.

The chryso-zeolites of the present invention may also be used in conjunction with a wide range of suitable additives. Therefore, materials such as vermiculite, clays of all origins, nitrogen and/or phosphorus and/or potassium containing fertilizers and trace elements such as bore, copper, manganese and zinc among others may be used as additives and incorporated with chryso-zeolite A and/or X to form soil conditioners by mechanical admixing, pelletizing or extruding. The chryso-zeolite/carrier ratio will vary depending upon the type of additive employed but will generally fall between 10/1 and 1/10.

Soil Conditioning Properties of Zeolites

As mentioned earlier, the three most important characteristics of the chryso-zeolites which allow the process of the present invention to be carried out are the following:
high retention capacity for water and water-soluble organic and inorganic molecules;
high cation-exchange capacity;
solid, wide and regular framework of channels and cages.

Because of their good cation-exchange capacities, the zeolites of the present invention can play several roles in soil conditioning.

First by preloading the zeolites with some cationic plant nutrients such as potassium and/or calcium, the zeolites can release these nutrients into the soil whenever the latter becomes poor in such nutrients, by a simple process of equilibrium ion-exchange. It is also possible for the zeolitic material to trap nutient cations from the soil by ion-exchange and to release these cations when necessary.

The zeolites can also act as a buffer with respect to the soil, in fact, whenever the soil becomes basic as a result of massive formation of ammonium ions (organic decomposition) for example, the zeolites can absorb these ions and release some protons to neutralize the medium. On the other hand, if the soil becomes acidic either by a natural process such as formation of nitrous and nitric acids or as a result of the action of other external factors, the zeolites can release some alkaline or other dibasic cations.

Finally, because of their wide and regular framework of channels and cages, the zeolites can also contribute to the decrease in loss of ammonia by evaporation having stronger adsorption effects on ammonia molecules and also having a high retention capacity for water which can solubilize ammonia molecules.

Furthermore, since zeolite are resistant to most chemicals as well as abrasion, they can be considered as permanent soil conditioners.

Many zeolitic materials possess interesting soil conditioning properties. In fact, basically all the materials which contain silicon, aluminum, alkali and eventually organic bases or compounds, could be used. These materials include silica gels, soluble silicates of sodium or of other alkaline/alkaline-earth elements, aluminate of sodium or of other alkaline/alkaline-earth elements, or salts of aluminum. These materials also include asbestos minerals and/or fibers from which magnesium and/or iron have been partially leached out, in order to form chryso-zeolite as described in U.S. Pat. No. 4,511,667, issued Apr. 16, 1985. Most of these materials provide similar conditioning properties, except for chryso-zeolite for which exceptionally higher water-retention properties were discovered.

After investigation, it was found that the chryso-zeolite materials possessing the most efficient conditioning properties had the following composition: $SiO_2$: between 37 and 60 wt%, $Al_2O_3$: between 10 and 25 wt%, $Na_2O$ (and/or $K_2O$, and/or $CaO$ and/or $(NH_4)_2O$): between 25 and 35 wt%, $MgO$: between 0.1 and 15 wt% and $Fe_2O_3$: between 0.1 and 2.5 wt%.

The chryso-zeolites of the present invention demonstrated unexpected soil conditioning properties, mainly in terms of cation-exchange and water-retention capacities. Considering cation-exchange capacity, it was found to be at least three times higher than that of montmorillonite and at least 30 times higher than kaolinite. As for water retention properties, the chryso-zeolites of the present invention demonstrated unexpectedly better results than all the commercial zeolites which all tend to provide similar results. A comparison of water retention properties is demonstrated in FIGS. 1-5. In these figures, the scale representing the degree of moisture has been established arbitrarily and it was determined that 3 units corresponded to the frontier between dryness (below 3) and wetness (above 3) of the soil.

The preparation of the products of the present invention will be more readily illustrated by referring to the following examples which are given to illustrate rather than limit the scope of the present invention thereto.

EXAMPLE 1

Preparation of Chryso-Zeolite AA-002

200 g of asbestos fiber [7TF-12 short fiber grade, chemical composition (dried oxide basis): $SiO_2=42.8\%$ wt/wt, $MgO=50.2\%$, $Fe_2O=6.6\%$ as FeO and $Na_2O=0.1\%$ other impurities=0.3%] were digested in a 3N HCl solution (2,000 ml) at 80 degrees C. for 5 hours. After dilution with cool water, the suspension was allowed to settle for approximately 12 hours, then filtered, washed with water and finally dried at 120 degrees C. The resulting solid material called Alix 0.44 (87 g) exhibited a MLD of 94.3%. Whenever used herein, the term MLD is defined as:

$$(MLD) = \frac{(MgO)_i - (MgO)_f}{(MgO)_i} \times 100\%,$$ where $(MgO)_i$ and $(MgO)_f$ are, respectively, the initial and final magnesium contents (on the dried oxide basis).

10 g of the leached asbestos material (Alix 044) were mixed with an aqueous solution containing NaOH (3.3 g), sodium aluminate (28.3 g) from Fisher Sc. Co. [% weight composition: $Al_2O_3=46.8$, $Na_2O=28.4$, water=balance] dissolved in 99.2 ml of distilled water.

The suspension was loaded in an autoclave and heated at 100 degrees C. for 12 hours.

After unloading, the suspension was filtered and the solid was washed thoroughly with distilled water and dried at 120 degrees C. for approximately 12 hours.

The resulting solid (20.0 g) exhibited the A zeolite structure through the X-ray powder diffraction technique. Its degree of crystallinity in A zeolite was 83% circa. Its chemical composition (dried oxide basis) was as follows:

$SiO_2$=43.2 wt%, $Al_2O_3$=22.9%, $Na_2O$=33.1%, $MgO$=0.4%, $Fe_2O_3$=0.2%. The resulting chryso-zeolite was labelled AA-002.

EXAMPLE 2

Preparation of Chryso-Zeolite AA-011

600 g of 7TF-12 grade asbestos fibers were digested in a 2.4N HCl solution (6,000 ml) at 80 degrees C. for 3.75 hours. After dilution with cool water, the suspension was allowed to settle approximately 12 hours, then filtered, washed with water and finally dried at 120 degrees C. The resulting solid material called Alix 066 (257 g) exhibited a MLD of 94.6%.

20 g of the leached asbestos material (Alix 066) were mixed with an aqueous solution containing NaOH (4.0 g), sodium aluminate (30.0 g) from Fisher Sc. Co., both dissolved in 190 ml of distilled water. The suspension was loaded in an autoclave and heated at 100 degrees C. for 3 days. After unloading, the suspension was filtered and the solid was washed thoroughly with distilled water and dried at 120 degrees C. for approximately 12 hours.

The resulting solid (42.5 g) exhibited the A zeolite structure through the X-ray powder diffraction technique. Its degree of crystallinity in A zeolite was 68% circa. Its chemical composition (dried oxide basis) was as follows:

$SiO_2$=40.1 wt%, $Al_2O_3$=23.8%, $Na_2O$=35.0%, $MgO$=0.6% and $Fe_2O_3$=0.5%. This sample was labelled chryso-zeolite AA-011.

EXAMPLE 3

Preparation of Chryso-Zeolite AX-001

7 g of the leached asbestos material obtained in Example 2 (Alix 066) were mixed with an aqueous solution containing NaOH (8.5 g), sodium aluminate (6.0 g) from Fisher Sc. Co., both dissolved in 100 ml of distilled water. The suspension was loaded in an autoclave and heated at 100 degrees C. for 3 days. After unloading, the suspension was filtered and the solid was washed thoroughly with distilled water and dried at 120 degrees C. for approximately 12 hours.

The resulting solid (9.9 g) exhibited the X zeolite structure through the X-ray powder diffraction technique. Its degree of crystallinity in X zeolite was 77% circa. Its chemical composition (dried oxide basis) was as follows:

$SiO_2$=49.3 wt%, $Al_2O_3$=20.3%, $Na_2O$=29.0%, $MgO$=0.7% and $Fe_2O_3$=0.7%. This chryso-zeolite was labelled AX-001.

Measurement of the Water-Retention Properties of Mixtures Containing Soil and the Various Chryso-Zeolites of the Present Invention or Commercially Available Zeolites In order to assess the water-retention properties of soil containing the various zeolites prepared in accordance with the present invention and to compare these properties with the water-retention capacities demonstrated either by soil or by soil containing commercially available zeolites, the following procedure was chosen: soil was intimately admixed with the active material, either a zeolite or a chryso-zeolite, after which the degree of moisture of the resulting mixture and of a reference soil was measured. The same volume of water was then homogeneously spread on the mixture and on the reference soil, after which moisture measurements were taken periodically.

Measurement of the Water-Retention Property of Linde Na-A Commercial Zeolite The water-retention property of Linde Na-A commercial zeolite was determined by first preparing a mixture containing soil and 5 wt% of Linde Na-A zeolite. The soil used for this experiment was the Folia-mix all purpose soil whose chemical composition was as follows (expressed in weight %): $SiO_2$=23.7%, $Al_2O_3$=4.6%, $Na_2O$=5.1%, $MgO$=0.4%, $Fe_2O_3$=0.6%, other inorganic components: 10.3%, C=19.6% and other volatile substances: 35.7%. The initial moisture content of both the soil and the mixture was measured using a Mask-Rite Moisture Meter and reached 1.7 arbitrary units. As it can be further seen in FIGS. 1 to 5, the behaviour of the reference soils, although all coming from the same source, depends largely on the initial wetness state. In fact, slight variations in the initial wetness state can lead to noticeable differences in water-retention times when constant amounts of water are added to each pot. It is worth mentioning that according to the Meter's manufacturer, a measure of 3 arbitrary units was determined to be the frontier between the dryness and wetness states of the soils.

Thus, 200 g of the soil-Linde Na-A zeolite mixture were loaded in a cylindrical container having an upper diameter of 80 mm and a lower diameter of 65 mm; and 200 g of pure soil were loaded in a similar container in order to serve as a reference sample. In a subsequent step, 25 ml of distilled water were spread on the surface of each sample. The first moisture level measurements were taken only 5 hours after water spreading in order to permit a homogeneous distribution of water throughout samples. Readings were taken at different locations within the samples by having the tip of the Mask-Rite hydrometer inserted at about 30 mm from the soils surface. Average values are reported in FIG. 1, where it can be seen that the soil alone reached a dry state after 5 days while the soil-Linde Na-A zeolite mixture remained in a wet state for close to 10 days.

Figure 2:
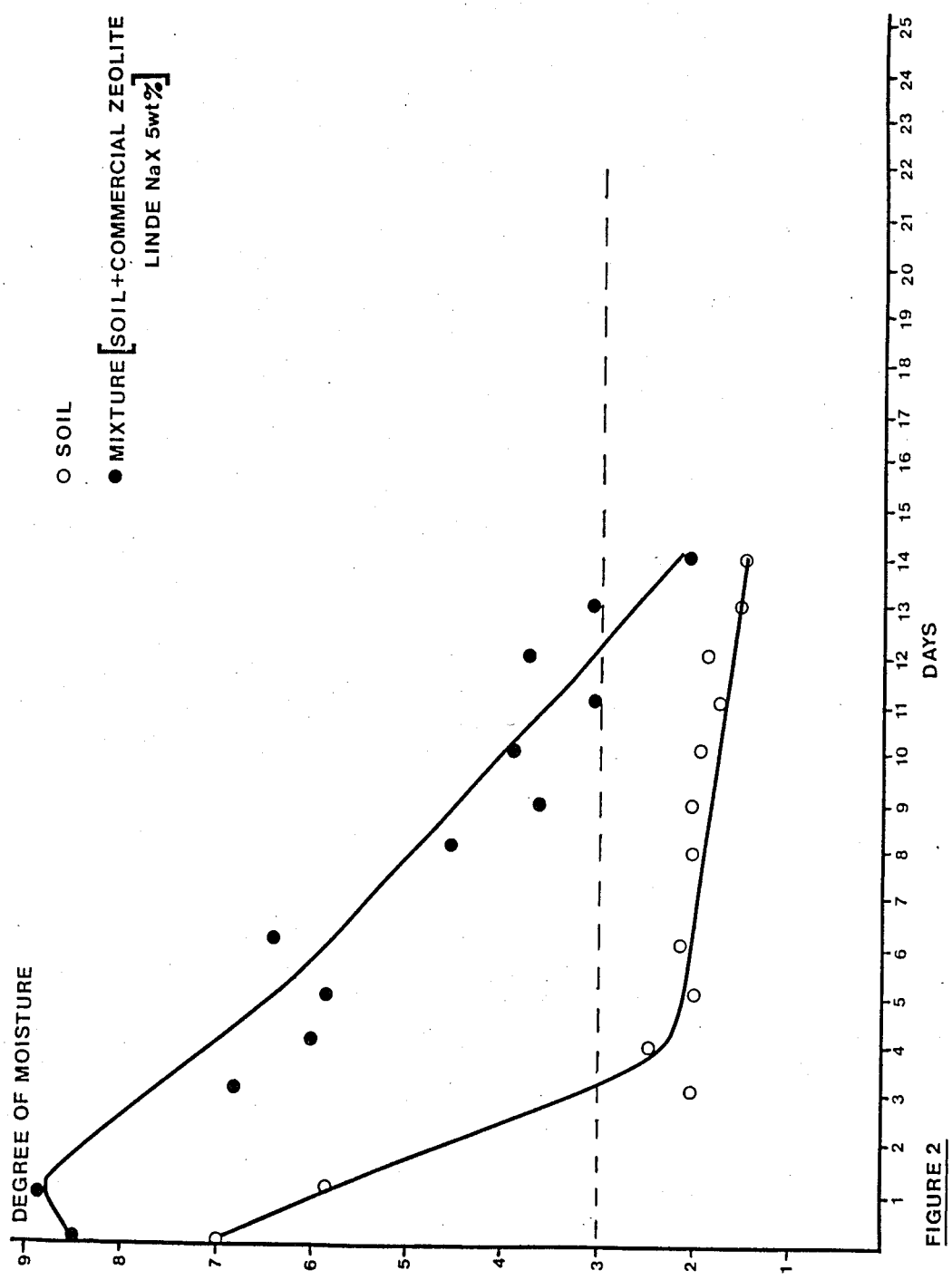
FIG. 2 represents a comparison of the water-retention properties of soil containing commercial zeolite Linde Na-X and soil alone.
Figure 3:
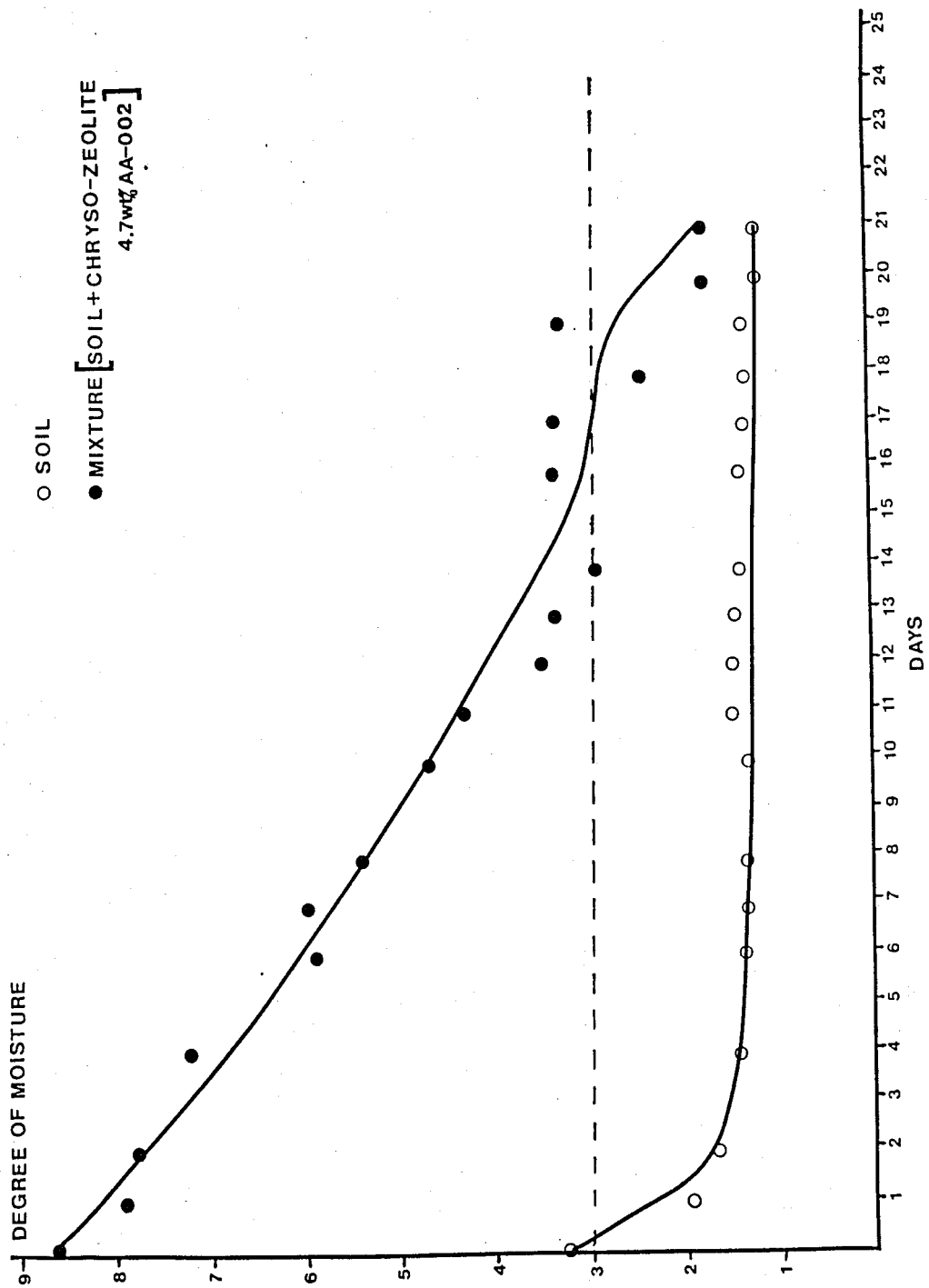
FIG. 3 represents a comparison of the water-retention properties of soil containing AA-002 chryso-zeolite and soil alone.

Measurement of the Water-Retention Property of Linde Na-X Commercial Zeolite In FIG. 2, the results obtained for a mixture containing soil and 5 wt% of Linde Na-X zeolite were found to be relatively similar to the results obtained for the Linde Na-A zeolite. The method used to perform these tests was the same as the one previously described for Na-A zeolite, except for the fact that the initial moisture level of both the soil and the soil-Linde Na-X zeolite mixture were found to be 1.6 arbitrary units. Thus, one would expect similar periods of wetness for other mixtures containing zeolites having the same structure as the commercial Linde products, that is in the range of 10 to 12 days.

Measurement of the Water-Retention Property of AA-002 Zeolite

When tests similar to those performed for Na-A and Na-X zeolites were performed on the chryso-zeolites described in the present invention, unexpectedly longer water-retention times are observed, particularly for the AA-002 and AA-011 chryso-zeolites.

These findings were discovered by performing tests on a mixture containing soil and 4.7 wt% of chryso-zeolite AA-002. Both the soil-AA-002 chryso-zeolite mixture and the reference soil exhibited an initial moisture level of 1.5 arbitrary units. The testing procedure followed was identical to the procedure defined above for the Linde Na-A zeolite. As it can be seen in FIG. 3, an unexpectedly longer retention time of close to 17 days was obtained for the soil-AA-002 chryso-zeolite mixture. This time represents an improvement ranging between 42 and 70% over commercial zeolites.

Measurement of the Water-Retention Property of AA-011 Zeolite

Figure 4:
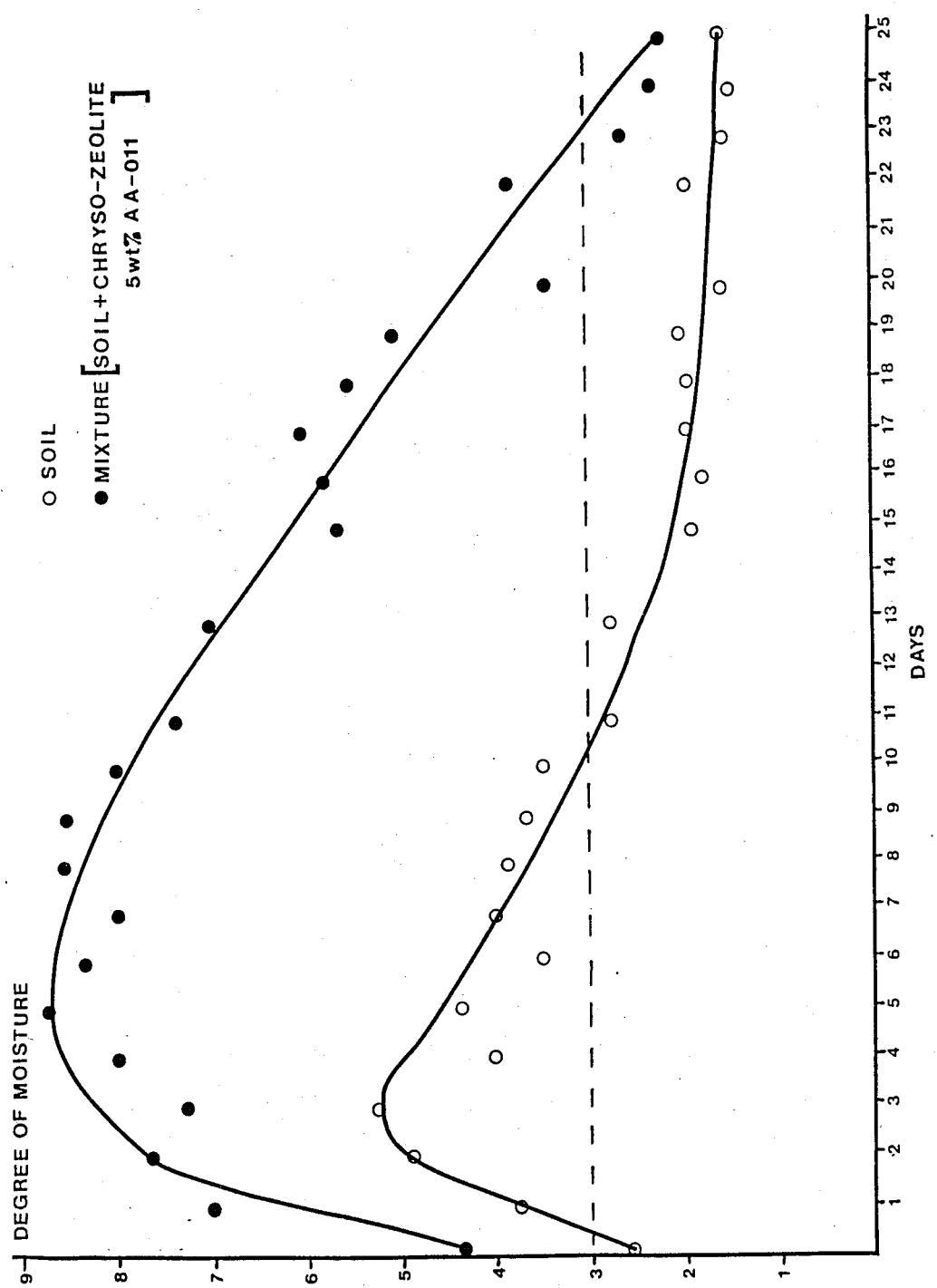
FIG. 4 represents a comparison of the water-retention properties of soil containing AA-011 chryso-zeolite and soil alone.
Figure 5:
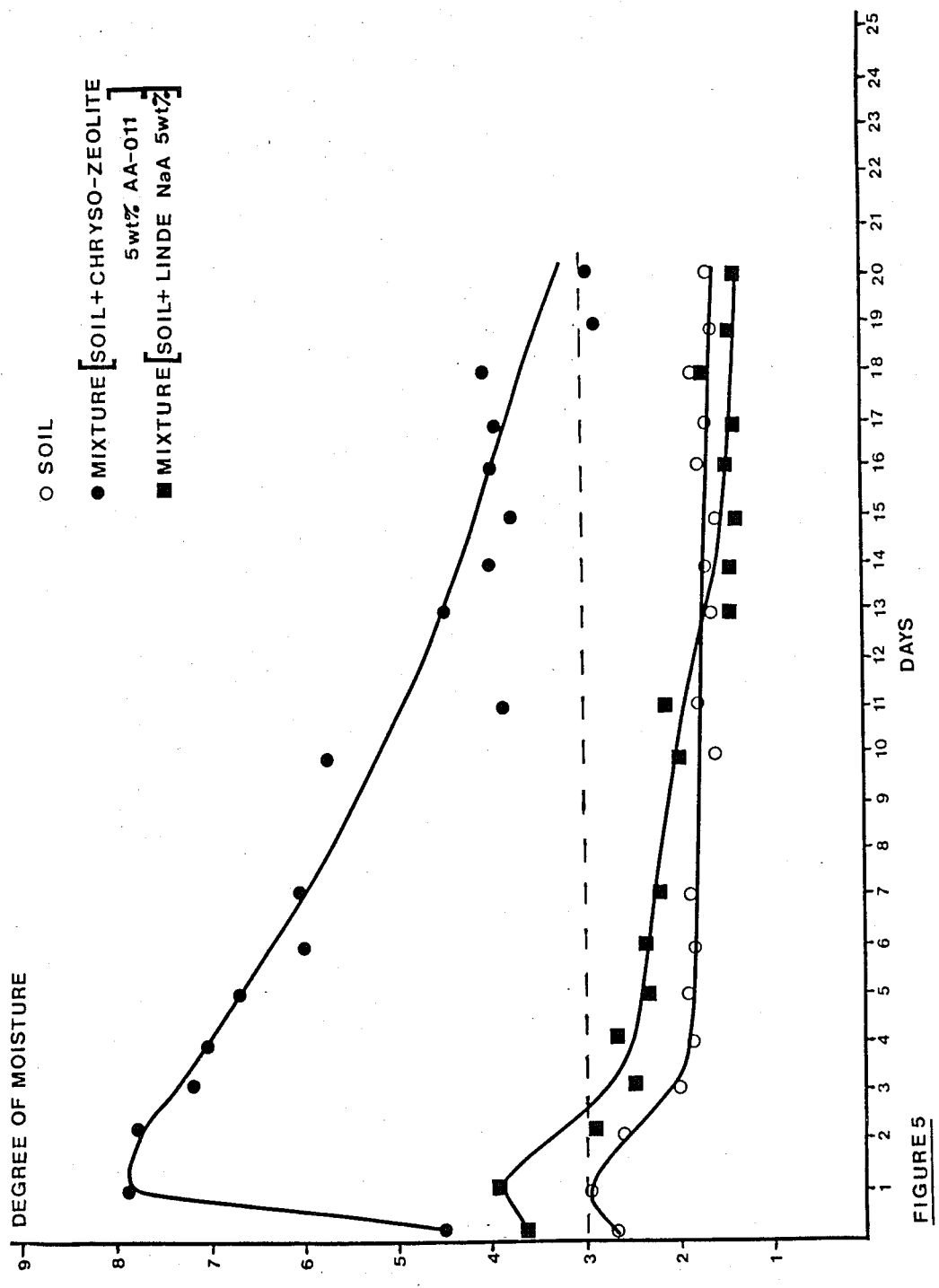
FIG. 5 represents a comparison of the water-retention properties of soil containing commercial zeolite Linde Na-A, soil containing chryso-zeolite AA-011 and soil alone.

FIG. 4 shows the results obtained from the test performed on a mixture containing soil and 5wt% of an AA-011 chryso-zeolite sample. The testing procedure used for the soil-Linde Na-A zeolite mixture was also followed for the soil-AA-011 chryso-zeolite mixture, which, like its soil reference, exhibited an initial moisture level of 1.8 arbitrary units. Again, unexpectedly high retention times were obtained for the soil-AA-011 chryso-zeolite mixture when compared to the soil mixtures containing the commercial zeolites. The wet state lasting 23 days for the soil-AA-011 chryso-zeolite mixture represents an improvement ranging between 120 and 183% over mixtures containing the commercial zeolites.

In order to further illustrate the unexpected water-retention time differences between the various samples (a mixture containing soil and chryso-zeolite AA-011, a mixture containing soil and Linde Na-A zeolite and soil alone), additional testing was performed using the following technique: a first container was filled with 180 g of Terro potting soil, having the following chemical composition (expressed in weight %): $SiO_2=24.8\%$, $Al_2O_3=16.0\%$, $Na_2O=7.9\%$, $MgO=0.1\%$, $Fe_2O_3=3.2\%$, other inorganic components: 10.0%, $C=14.7\%$ and other volatile substances=23.3%, and having an initial moisture level of 1.0 arbitrary units. It is to be noted that the percentage of organic components in the Terro potting soil, which is represented by its carbon content (14.7 wt% as well as its percentage of other volatile substances (23.3 wt%) is, at 38 wt%, lower than for the Folia mix all purpose soil which had an organic product content of over 55%. Since organic products are believed to have a tendency to enhance water-retention properties, this would explain the lower initial water-retention capacities of the Terro potting soil.

In a second similar container, 180 g of a mixture containing Terro potting soil and 5 wt% of commercial Linde Na-A zeolite was added while in a third container 180 g of a mixture containing Terro potting soil and 5 wt% of the AA-011 chryso-zeolite sample was added. In a subsequent step, 25 ml of distilled water were spread on each of the sample surfaces. The first moisture level measurements were taken only 5 hours after water spreading in order to allow a homogeneous distribution of water throughout the samples. Readings were taken at different locations within the samples by having the tip of the Mask-Rite hydrometer inserted at about 30 mm from the soil's surface. Average values are reported in FIG. 5, where the unexpectedly superior water-retention properties of the soil-AA-011 chryso-zeolite mixture over soil-Na-A zeolite mixture or soil alone can be easily visualized. Similar results were obtained with the chryso-zeolite A, in which, parts or most of the Na ions were exchanged with K, ammonium or Ca ions. Thus, these facts demonstrate how chryso-zeolite AA-011 is more efficient than the commercial zeolite having the same zeolitic structure. This unexpectedly property might result from the fact that since leached asbestos material does exhibit some retention capacities for water. It is also possible that the combined adsorption capacities of both the zeolite particles and the asbestos remnants cause enhanced efficiency.

BIOLOGICAL ACTIVITY OF AA-011 CHRYSO-ZEOLITE

Another important aspect of the present invention is the biological activity associated with the new products described herein and especially chryso-zeolite AA-011 whose biological properties have been further investigated.

(1) Geometry:

Chryso-zeolite AA-011 has a completely different geometry when compared to the starting material of Example 2 (7TF-12 asbestos fibers). Whereas the starting material displays a well-defined fibrous geometry, with long, film fibres having aspect ratios (length over diameter) well above 3:1, chryso-zeolite AA-011 particles do not show any fibrous structure, and their configuration is that of an irregular shaped particle.

(2) Biological tests

In order to test the biological activity of chryso-zeolite AA-011, two well-known in vitro assays were performed, where similar amounts of chryso-zeolite AA-011 were compared with the chrysotile asbestos used in its preparation. The two bio-assays used were: the hemolytic potential, and the response of rat alveolar macrophages.

(A) Hemolytic potential

Whole blood was obtained from the inferior vena cava of two ether-anaesthetized adult male long island rats (250–300 g/body weight). The whole blood was then immediately suspended in 400 ml of Veronal ® buffer solution (290±5 mOsm) of pH 7.28. Erythrocytes were washed 3 times, and a 4% by volume suspension of the rat red blood cells (RBC) was prepared in the Veronal ® buffer.

Weighed amounts of test samples were suspended in 12.5 ml of Veronal ® buffer using a Dounce ® tube. The concentration of test materials used was 1,000 µg/ml. Suspensions of dispersed materials were placed in 30 ml Falcon ® flask with 12.5 ml of the RBC suspension (final concentration of RBC: 2%). Flashs were incubated at 37° C. in a Dubnoff ® C metabolic shaking incubator. From each test tube and control, 3 ml samples were taken after 60 minutes of incubation. Samples were centrifuged for 5 minutes to precipitate ghosts and intact RBC. One ml of supernatant was diluted with 3 ml of Veronal ® buffer and the absorbance was determined at 541 nm. Complete hemolysis was obtained by the addition of Triton ® X-100 to a 2% suspension of RBC in distilled water, and determined as described before.

(B) Cytotoxicity

For the procurement of rat alveolar macrophages, the cells were harvested by bronchoalveolar lavages. Male Long-Evans black hooded rats (250-300 g/body weight) were killed by an i.p. overdose of sodium pentobarbital. After tracheotomy, serial lung lavages were carried-out in situ by instillating calcium and magnesium-free Hanks ® balanced salt solution (HBSS), pH 7.4 at 37° C., supplemented with glucose (1 g/l). Free lung cells ($\cong 10^7$ cells/rat) were isolated by low speed centrifugation, and resuspended in distilled $H_2O$, followed addition of HBSS to restaure osmotic equilibrium. This step was introduced to rule out any contamination by RBC. After serial washings, the cells (>95% macrophages) were counted on a hemocytometer and the viability (93-97%) was estimated by the trypan blue test (0.4% solution). Unless otherwise mentioned, all operations were performed at 4° C. and with sterilized material.

The cells (400,000 cells/1.5 ml of medium) were then incubated at 37° C. for 24 hrs in multiwell plates. The incubtion was performed in filtered normal air and the humidity in the incubation chamber was maintained around 80%. The alveolar macrophages were incubated in sterile MEM medium (Hanks' salts) supplemented with 5 mM $CaCl_2$ and 5 mM $MgCl_2$, 2 mM L-Glutamine, 4% (V/V) heat-inactivated foetal calf serum and antibiotics (initial pH: 6.8 at 37° C.).

Aliquots of 250 $\mu l$/400,000 cells of the test materials were selected for the assay.

After a 18-hr incubation period, the cell-free incubation mediums were collected and assayed for:
Cell viability, by measuring ATP content;
Cytoplasmic enzyme leakage, by measuring lactic dehydrogenase (LDH);
Lysosomal enzyme leakage, by measuring $\beta$-Galactosidase ($\beta$-GAL).

All spectrophotometric analyses were done on a double-beam spectrophotometer.

It is seen in TABLE 3 that contact of red blood cells (RBC) with untreated chrysotile leads to an almost total hemolytic response (95.5%) after 60 minutes of contact with 1,000 $\mu g$ chrysotile, whereas the corresponding AA-011 chrysozeolite, resulting from the modification of chrysotile, leaves the RBC essentially comparable to control values. This indicates that chryso-zeolite AA-011 does not damage the cell membranes of the RBC.

TABLE 3

| Hemolytic response to chrysotile vs chrysozeolite AA-011 | |
| --- | --- |
|  | Percentage of hemolysis (60 min.) |
| Control | 0.0 |
| Chrysotile (1,000 $\mu g$) | 95.0 |
| Chrysozeolite AA-011 (1,000 $\mu g$) | 0.0 |

Concurrently, TABLE 4 shows the effects on three parameters of pulmonary macrophage response which are widely accepted as indices of cytotoxicity: viability, and leakage of two marker enzymes ("LDH and $\beta$-GAL") after exposure to mineral particles. It can be seen that chrysotile fibres induce all three cytotoxic responses, whereas equivalent amount of chryso-zeolite AA-011 results in essentially no significant response from the cultured pulmonary macrophages.

TABLE 4

| Pulmonary macrophage response to chrysotile vs chrysozeolite AA-011 | | | |
| --- | --- | --- | --- |
|  | Viability (% control) | Enzyme leakage (% liberation) | |
|  | ATP[1] | LDH[2] | $\beta$-GAL[3] |
| Control | 100.0 | 2.1 | 1.2 |
| Chrysotile (250 $\mu g$) | 28.4 | 62.6 | 59.6 |
| Chrysozeolite AA-011 (250 $\mu g$) | 98.9 | 7.6 | 5.2 |

[1]ATP: Adenosine triphosphate
[2]LDH: Lactic dehydrogenase
[3]$\beta$-GAL: $\beta$-Galactosidase These data must be viewed in the light of the observation that there is a good correlation between the memolytic potential, the effect on macrophage and the fibrogenic activity of mineral dusts, including asbestos (Allison, A. C. et. al., 1977, Ann. Rheum. Dis., Vol. 36, Suppl. 8). Furthermore, it has been shown (Chamberlain, M. et al., 1978, Br. J. exp. Path., Vol. 59, pp 183-189) that there is a correlation between the cytotoxic activities of mineral dusts and their ability to induce mesothelial tumors.

What is claimed is:

1. A method for enhancing the water-retention capacity of soil and providing plant nutrients to the soil over an extended period of time, said method comprising admixing soils with from 2 to 30% by weight of a mixture comprising:
   (a) a chryso-zeolite of type A and/or X having an $SiO_2$ content of 37 to 60% by weight, an MgO content of 0.1 to 15% by weight, an $Fe_2O_3$ content of 0.1 to 2.5% by weight and containing from 10 to 25% by weight of $Al_2O_3$ and from 25 to 35% by weight of $Na_2O$, and/or $K_2O$ and/or CaO and/or $(NH_4)_2O$, and
   (b) an additive selected from the group consisting of vermiculite, clay, nitrogen and/or phosphorus and/or potassium containing fertilizers and trace elements, with the chryso-zeolite/additive ratio ranging from 1:10 to 10:1.

2. A method as set forth in claim 1 in which the chryso-zeolite comprises a magnesium leached asbestos matrix which has an $SiO_2$ content of from 40 to 50% by weight, an $Al_2O_3$ content of 17 to 25% by weight, an $Na_2O$ and/or $K_2O$ and/or CaO and/or $(NH_4)_2O$ content of 28 to 35% by weight an MgO content of 0.3 to 0.9% by weight and an $Fe_2O_3$ content of 0.1 to 1.0% by weight.

3. A method as set forth in claim 1 in which component (b) is chryso-zeolite and the amount of chryso-zeolite mixed with the soil is 5 to 10% by weight.

4. A method for enhancing the water-retention capacity of soil and providing plant nutrients to the soil over an extended period of time, said method comprising admixing soil with from 2 to 30% by weight of a mixture comprising
   (a) a chryso-zeolite of type A which comprises a magnesium leached asbestos matrix having 43.4% by weight of $SiO_2$, 22% by weight $Al_2O_3$, 33.1% by weight $Na_2O$, 0.4% by weight MgO and 0.2% by weight of $Fe_2O_3$, and
   (b) an additive selected from the group consisting of vermiculite, clay, nitrogen and/or phosphorus and/or potassium containing fertilizers and trace elements, with the chryso-zeolite/additive ratio ranging from 1:10 to 10:1.

5. A method for enhancing the water-retention capacity of soil and providing plant nutrients to the soil over an extended period of time, said method comprising admixing soil with from 2 to 30% by weight of a mixture comprising
   (a) a chryso-zeolite of type A which comprises a magnesium leached asbestos matrix having 40.1% by weight of $SiO_2$, 23.8% by weight $Al_2O_3$, 35.0% by weight $Na_2O$, 0.6% by weight MgO and 0.5% by weight of $Fe_2O_3$, and
   (b) an additive selected from the group consisting of vermiculite, clay, nitrogen and/or phosphorus and/or potassium containing fertilizers and track elements, with the chryso-zeolite/additive ratio ranging from 1:10 to 10:1.

6. A method for enhancing the water-retention capacity of soil and providing plant nutrients to the soil over an extended period of time, said method comprising admixing soil with from 2 to 30% by weight of a mixture comprising
   (a) a chryso-zeolite of type X which comprises a magnesium leached asbestos matrix having 49.3% by weight of $SiO_2$, 20.3% by weight $Al_2O_3$, 29.0% by weight $Na_2O$, 0.7% by weight MgO and 0.7% by weight of $Fe_2O_3$, and
   (b) an additive selected from the group consisting of vermiculite, clay, nitrogen and/or phosphorus and/or potassium containing fertilizers and trace elements, with the chryso-zeolite/additive ratio ranging from 1:10 to 10:1.

* * * * *